J. E. BURNS.
METHOD OF PRODUCING SERRATED EDGE.
APPLICATION FILED MAY 14, 1919.
1,435,514. Patented Nov. 14, 1922.
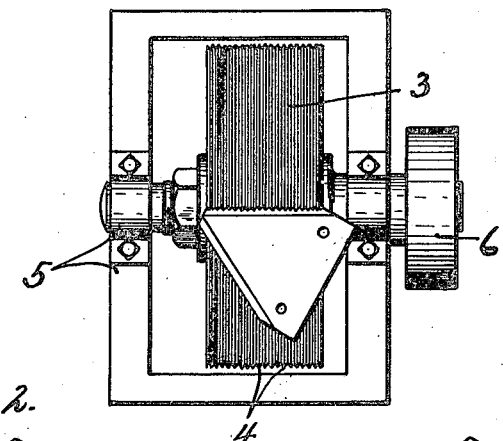
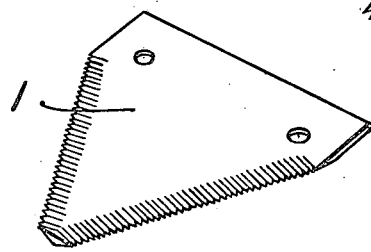
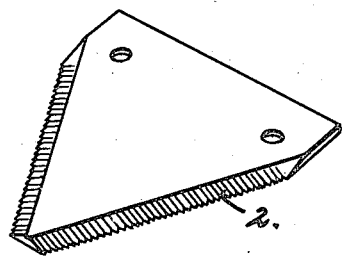
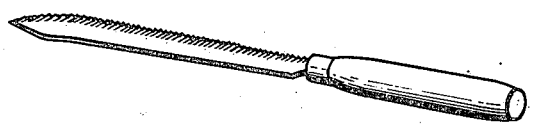
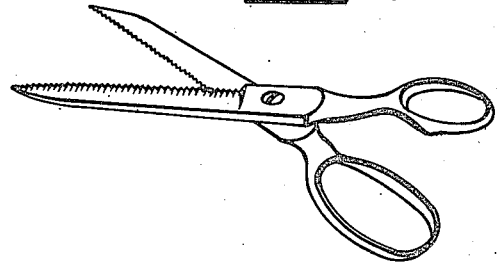
INVENTOR
Joseph E. Burns
BY
Ewison Thompson
ATTORNEYS.

Patented Nov. 14, 1922.

1,435,514

UNITED STATES PATENT OFFICE.

JOSEPH E. BURNS, OF SYRACUSE, NEW YORK.

METHOD OF PRODUCING SERRATED EDGE.

Application filed May 14, 1919. Serial No. 296,995.

*To all whom it may concern:*

Be it known that I, JOSEPH E. BURNS, of Syracuse, in the county of Onondaga, in the State of New York, have invented new and useful Improvements in Methods of Producing Serrated Edge, of which the following, taken in connection with the accompanying drawings, is a full, clear, and exact description.

This invention relates to certain improvements in method and apparatus for serrating edge tools and to certain of the tools as products.

The object of the invention is to produce an efficient, relatively inexpensive and simple method of producing serrations in the blade portion of edge tools by grinding therein a series of substantially regularly spaced grooves, thereby forming alternate recesses and projections in the blade to constitute the cutting edge thereof. So far as I am aware such a result has never been effected through the use of a grinding tool or wheel.

For this purpose, the wheel is formed with a series of substantially parallel circumferential alternate grooves and ridges upon its periphery of suitable form, size and shape to produce the character of serration desired.

By the use of such a grinding wheel a plurality of serrations may be simultaneously produced and preferably the grooved wheel should be of a width equal to the length of the cutting edge to be serrated whereby the entire edge may be uniformly serrated at a single operation.

Other objects and advantages will appear from the following description taken in connection with the accompanying drawings in which—

Fig. 1 is a view of an apparatus for carrying out my invention, illustrating a mowing machine knife to be serrated.

Fig. 2 shows a mowing machine knife having a series of alternate grooves and ridges produced upon its substantially flat lower face to provide serrations at the edge of the blade.

Fig. 3 is a view of a similar knife having the alternate grooves and ridges produced upon the inclined beveled surface.

Fig. 4 is a view of a butcher knife having its edge serrated by the method of this invention.

Fig. 5 is a view of a pair of shears having its cutting edges serrated by the method of this invention.

As illustrative of one application of my invention, I have shown a mowing machine knife —1— of usual form and shape and having its edge provided with a plurality of serrations formed by grinding a plurality of spaced grooves in portions adjacent the edge thereof. These grooves may perhaps preferably be formed in the lower flat face of the knife so that subsequent grinding of the beveled inclined surface —2— will not destroy or partially destroy the grooves and ridges but on the other hand subsequent grinding will merely reform the serrations which continue to be of substantially uniform size and shape.

In Fig. 1 I have illustrated a grinding wheel of a width suitable for forming such grooves and ridges upon the knife blade at a single operation. This wheel —3— is formed of a suitable abrasive for the purpose in hand and is preferably an aluminum oxide material. The periphery of the wheel is formed with a series of alternate grooves and ridges, such grooves being formed therein in any suitable manner to provide a plurality of substantially parallel circumferential cutting edges —4— adapted to form the grooves in the cutting edge of the tool, as for instance, the knife, the shears, or other edge tools. The wheel —3— may be mounted in any suitable manner and I have shown it as rotatably supported in frame work —5— and adapted to be power driven by pulley —6—. By the use of such a wheel serrations of desired form and size may be produced to produce a highly efficient cutting edge. Although preferably the wheel is of the width at least equal to the width of the edge to be serrated, such a construction is not essential and I do not desire to limit myself to any specific size of wheel. By merely holding the edge portion of the tool to be ground in contact with the grinding wheel, the alternate grooves and ridges will be formed to provide the serrated edge.

Although I have shown and described particular apparatus and particular edged tools as adapted to be serrated by said apparatus, I do not desire to limit myself to any particular form, size or shape of apparatus or to specific edged tools except where the same may be specifically set forth in detail in the claims hereto appended.

What I claim is:—

1. The method of forming a serrated edge upon a cutting blade, comprising bringing one side of said cutting blade into contact with an abrasive wheel having upon its surface a plurality of circumferential substantially parallel uniform ridges spaced by narrow grooves, while the wheel is rotating and maintaining such contact to simultaneously form upon said blade a plurality of relatively fine uniformly spaced, accurately shaped, substantially V-shaped grooves, deepening toward the edge of the blade, and intersecting and breaking the continuity of the edge of said blade, and determining a plurality of substantially similar V-shaped teeth.

2. The method of forming a serrated edge upon a cutting blade comprising shaping an integral grinding wheel with a plurality of circumferential substantially parallel uniform ridges spaced by narrow grooves, and bringing one side of said cutting blade into contact with said wheel, while the latter is rotating, to simultaneously form upon said blade a plurality of laterally extending relatively fine uniformly spaced accurately shaped substantially V-shaped grooves intersecting and breaking the continuity of the edge of said blade, and determining a plurality of substantially similar V-shaped teeth.

In witness whereof I have hereunto set my hand this 6th day of May 1919.

JOSEPH E. BURNS.

Witnesses:
H. E. CHASE,
E. A. THOMPSON.